United States Patent [19]

Burgardt et al.

[11] Patent Number: 4,596,506
[45] Date of Patent: Jun. 24, 1986

[54] AIR BEARING WHEEL LIFT

[75] Inventors: Vernon E. Burgardt, Saint Peters, Mo.; Mel D. Terry, Lynwood, Wash.

[73] Assignee: McDonnell Douglas Corporation, Long Beach, Calif.

[21] Appl. No.: 467,205

[22] Filed: Feb. 16, 1983

[51] Int. Cl.⁴ .......................... B65G 7/06; B66F 3/24; B60B 29/00
[52] U.S. Cl. ..................................... 414/426; 414/429; 410/30; 410/49; 254/93 HP; 180/125
[58] Field of Search ................... 414/426, 427, 429; 254/93 HP; 187/8.52; 410/9, 10, 19, 22, 23, 30, 42, 47, 49; 180/125

[56] References Cited

U.S. PATENT DOCUMENTS

| | | | |
|---|---|---|---|
| 2,380,313 | 7/1945 | Johnson et al. | 414/427 X |
| 2,464,021 | 3/1949 | Bryant | 410/30 |
| 2,525,437 | 10/1950 | Winzler et al. | 414/427 |
| 2,541,494 | 2/1951 | Bryan | 414/427 |
| 2,549,489 | 4/1951 | Krause | 414/427 |
| 2,583,216 | 1/1952 | Hoffman | 414/427 |
| 2,611,495 | 9/1952 | Weaver | 410/42 |
| 2,803,132 | 8/1957 | Clayton | 254/93 HP |
| 3,172,166 | 3/1965 | Imbrecht | 254/93 HP |
| 4,240,773 | 12/1980 | Terry | 180/125 X |
| 4,337,921 | 7/1982 | Edwards | 254/93 HP |

*Primary Examiner*—Joseph E. Valenza
*Assistant Examiner*—David A. Bucci
*Attorney, Agent, or Firm*—Paul T. Loef; George W. Finch; Donald L. Royer

[57] ABSTRACT

A wheel lift for lifting multi-wheeled vehicles. A wheel lift is applied at each wheel and has a generally U-shaped base supported by an air bearing under each arm. A pair of adjustable chocks engage the wheel near the floor. Either a hook engages the wheel generally opposite the chocks or for application of the device on the inboard side of the wheel, a support member picks up the vehicle structure to resist any overturning moment and provide stability.

14 Claims, 5 Drawing Figures

AIR BEARING WHEEL LIFT

BACKGROUND OF THE INVENTION

This invention pertains to air bearing devices for handling large objects and more particularly to large objects mounted on wheels.

Historically, the installation of an engine in a jet aircraft involved a process that required considerable time-consuming maneuvering. Typically a jet engine is shipped in a cylindrical container which contains the engine and its own support dolly. At the point of destination, the engine and dolly, in combination, are removed from the shipping container and placed on a four-wheel transport device for further movement, either to storage or the assembly line. Typical of these transport devices is the Air Log Model 4000 engine dolly, or equivalent, which is widely used by aircraft manufacturers, airlines, and the military for transporting and installing engines. While many of these wheeled engine transporters are provided with devices for three axes of movement of the engine, engine installation requires precise alignment of the engine to the aircraft support structure. The weight and cumbersomeness of the transport dolly, the engine dolly, and the engine makes maneuvering difficult. Precise alignment of the engine to the engine mounting structure is necessary to avoid overstressing the engine support structure. This issue was highlighted by the tragic aircraft accident in Chicago in June, 1979, which was alleged to be caused by overstressing the engine pylon support structure during engine replacement.

Perhaps the closest prior art in function is the apparatus described in Aviation Week and Space Technology, Dec. 21, 1981. While this apparatus differs substantially in approach and structure to the instant invention, it exemplifies the problem.

The closest known prior art in teaching is U.S. Pat. No. 4,240,773, issued to Terry, co-inventor of the instant invention. That apparatus is directed to handling large rolls of paper and requires a great deal of space on either side of the roll to be lifted. The reference teaches two arms which slideably mount on a cross member and are driven by two pneumatic cylinders to grasp the paper roll as opposed to a pair of chocks in the instant invention, one of which is pneumatically actuated by a bladder to engage the wheel. Of much greater importance, the reference uses four air bearing pads, two on each side of the torus. Since, three points establish a plane, this apparatus is stable but requires considerably more space around the wheel to be lifted. In the subject invention, two air bearings are used, one on each side of the wheel and requires a third point for support to react the overturning moment. The third point is provided by either an arm attached to the base which terminates in a hook engaging the perimeter of the wheel, generally opposite the chocks, or in the alternate embodiment, a reaction point is provided against the structure of the vehicle to be lifted. The net result is that the apparatus of this device is smaller requiring less clearance, easier to handle, and cheaper, as it eliminates one of the air bearings.

Of course, the application of this wheel lift is not limited to engine installation and removal. It applies equally well to dollies or wheeled fixtures which support large heavy major aircraft assemblies which need to be joined together and require matching interfacing parts.

It is an important object of the present invention to provide an air bearing wheel lift device which is applied at each wheel of a multiple wheeled transporter so as to permit translation of the transporter in any direction parallel to the supporting floor when the air bearing are energized.

It is another object of this invention to provide a wheel lift which is light enough in weight for one man to handle, and small enough to clear the attaching structure of most vehicles.

Another object of this invention is to provide a wheel lift adaptable to essentially any size wheel or vehicle.

SUMMARY OF THE PRESENT INVENTION

In summary, the wheel lift of this invention accomplishes the above objects and overcomes the disadvantages of the prior devices by providing a wheel lift supported by two air bearings, one on either side of the wheel to be lifted and supporting a U-shaped structure which contains a pair of chocks, one or both of which is adjustable. The chocks engage the wheel at floor level, and since two air bearings establish a line as opposed to a plane, means are provided to resist any overturning moment. In the embodiment for application of the wheel lift from the outboard side of the wheeled vehicle, the means to resist the overturning moment is a support arm attached to the base which terminates in a hook which engages the perimeter of the wheel generally opposite the chocks so as to stabilize the device. In the alternative embodiment, for application of the wheel lift from the inboard side of the wheel which is attached to the wheeled vehicle, means are provided which engage fixed structure of the vehicle to be lifted, generally immediately adjacent the wheel, so as to stabilize any overturning moment. One wheel lift is required at each wheel position to lift the wheeled vehicle and permit translation in any direction parallel to the supporting floor upon application of air to the wheel lift.

BRIEF DESCRIPTION OF THE DRAWINGS

With reference to the drawings, wherein like reference numerals designate like portions of the invention.

DESCRIPTION OF THE PREFERRED EMBODIMENT

Figure 1:
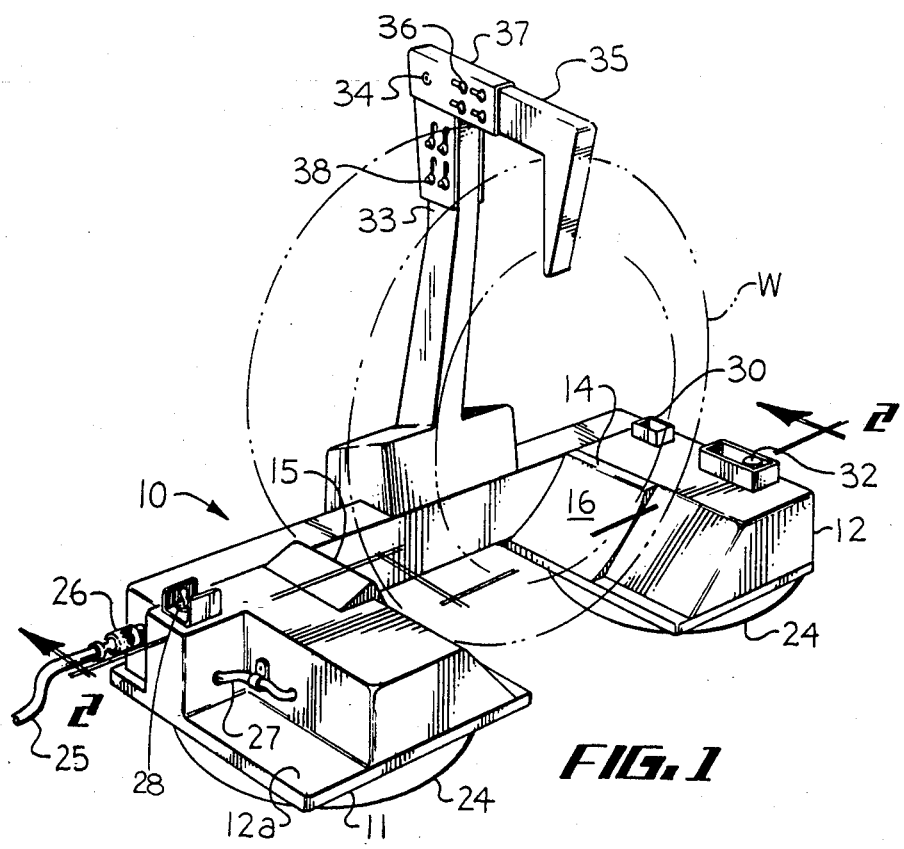
FIG. 1 is a perspective view of the wheel lift embodiment for application from the outboard side of the vehicle with the vehicle wheel shown in reference lines.
Figure 2:
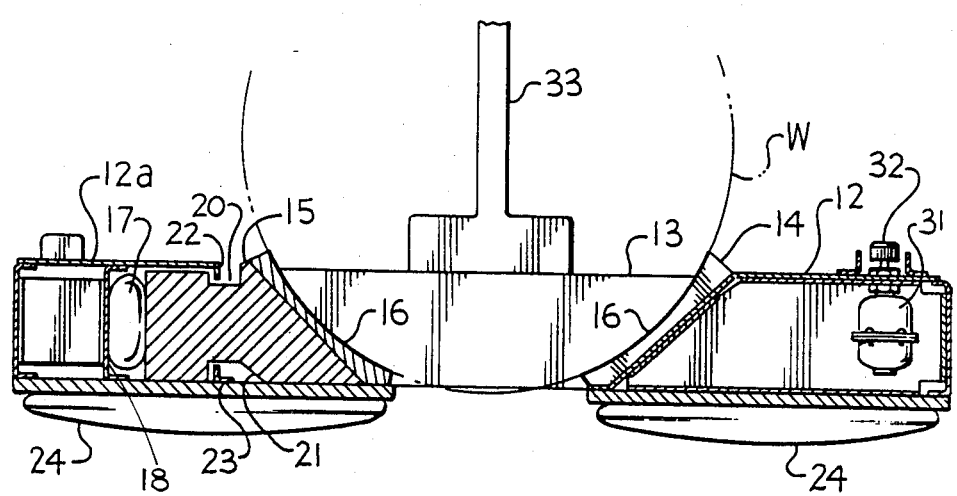
FIG. 2 is a section view through the lower portion of the wheel lift of FIG. 1.

FIG. 1 shows the embodiment of the wheel lift for application from the outboard side of the wheeled vehicle which will be described first. The base 11 is generally of a U-shape and has a pair of legs 12 and 12a connected by a cross-structure 13. In FIGS. 1 and 2, the wheel 'W' is shown in reference lines while no part of the vehicle attached to the wheel is shown. While typically the wheel consists of a wheel portion and a rubber air inflated tire as used on most roadable vehicles, it may be a solid wheel. As shown, the fixed chock 14 is contained in one leg 12 while a movable chock 15 is contained in the other leg 12a. The surface 16 of both chocks 14 and 15 are radiused or sloped so as to better engage the wheel 'W'. Movable chock 15 slides within its enclosure as contained in the leg 12a when the air bladder 17 is energized. The air bladder 17 reacts between the containment structure wall 18 and the movable chock 15. The movable chock has upper and lower cutouts 20 and 21, respectively, to accommodate upper and lower stops 22 and 23, respectively.

An air bearing 24 is shown attached to the bottom side of each leg 12 and 12a. The current invention recognizes that air bearings are not new and are available from several sources. However, it is important to select the proper air bearing package. The air bearings shown here are available from Air Film Corporation, 20215-64th Avenue W, Lynnwood, Wash., as Model No. 12S-2.5E. Of course, air bearings must be selected in accordance with the weight of the object to be lifted. The particular model of air bearings selected is conducive for operation over rough floors, black-topped surfaces, and even dirt surfaces. It produces a substantial vertical displacement and better accommodates floor irregularities.

An air supply hose 25 is shown connected to the quick disconnect 26 on the outside wall of the leg 12a. On the inside of the wall (not shown), the supply line splits into one leg 27 through the air switch 28, which is nothing more than an on/off valve, passes through an air pressure regulator (not shown), and then connects to the air bladder 17. The other leg runs down the inside of the cross structure 13 and then connects (not shown) to an on/off indicator 30, and finally to a pressure regulator 31 and then to the air bearings 24. Rotation of the knob 32 on the pressure regulator 31 increases the pressure to the air bearings 24. A pressure gage between the regulator and the air bearings 24 may be advantageous.

Attached to the cross structure 13 is a vertical arm 33, generally contoured to avoid the wheel hub and better grasp the wheel which, in turn, pivotally supports, at 34, the adjustable hook 35. The adjustment of the hook 35 is provided by four slotted holes and fasteners 36 in the gusset 37 which provide adjustment for the hook to accommodate variation in width of the wheel 'W'. The vertical arm 33 is also readily adjustable by four slotted holes and fasteners 38 to accommodate different diameters and wheel widths.

Figure 3:
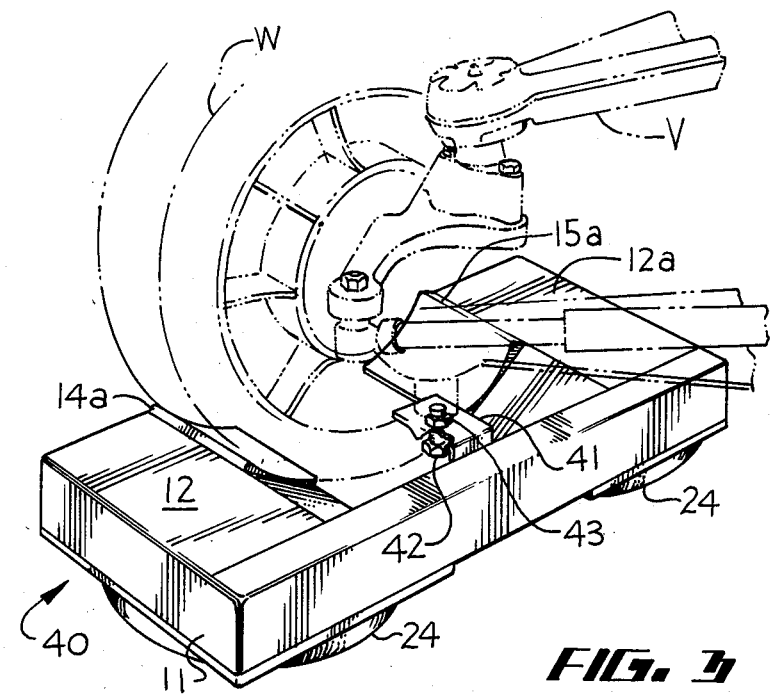
FIG. 3 is a perspective view of the embodiment of the wheel lift for application from the inboard side of the wheel and the vehicle wheel and part of the structure and the wheel turning means is shown in reference lines.
Figure 4:
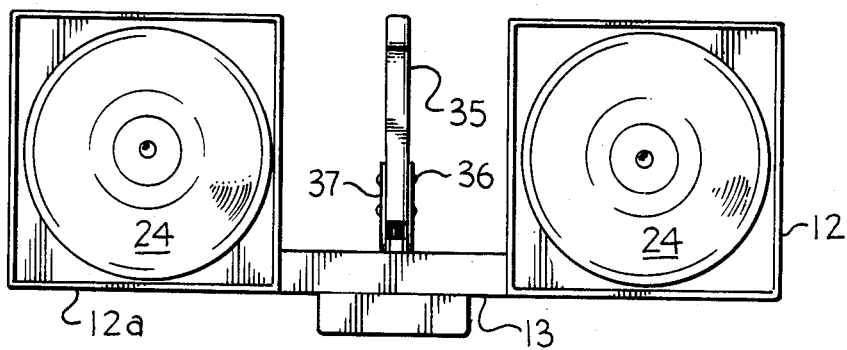
FIG. 4 is a bottom view of FIG. 1, which is also typical of FIG. 3.

An alternative embodiment of the wheel lift, adapted for application from the inboard side of the vehicle wheel, is shown in FIG. 3, and identified as 40. Attached to the cross structure 13 is the gusset bracket 41, which contains a threaded rod 42 which may be rotated for adjustment and locked by the jam nut 43 so as to positively engage a fixed structural portion of the vehicle so as to provide the support point to resist the overturning moment and provide the wheel lift with stability. It provides the same function as the combination vertical arm 33 and hook 35 in the embodiment of FIG. 1.

Figure 5:
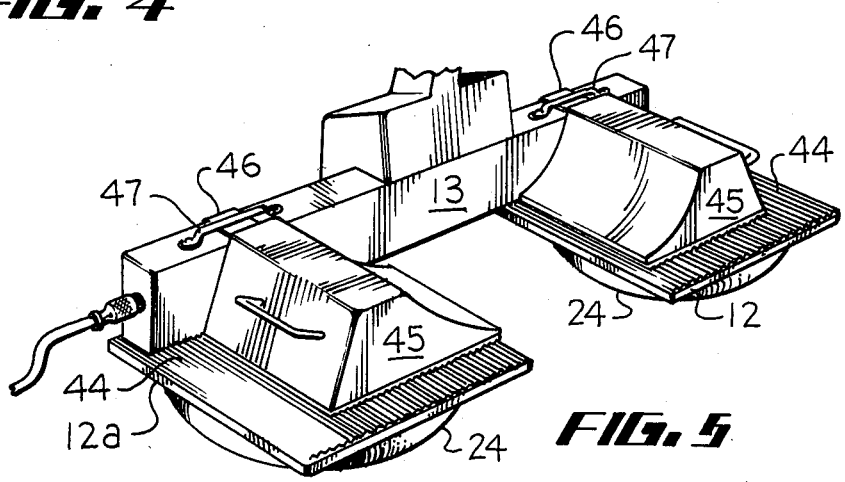
FIG. 5 is a partial perspective view as shown in FIG. 1 with an alternative embodiment for adjusting the chocks.

A more flexible embodiment of the chock adjustment is shown in FIG. 5. The upper surface of the legs 12 and 12a is serrated at 44 to match serrations on the bottom surface of the alternate chocks 45. The chocks are locked into place after final adjustment by the straps 46 by adjustable bolts (not shown). The straps are shown in guides 47 to prevent detachment and handles 48 are provided to ease the adjustment. This embodiment accommodates a wheel diameter change of 6 inches or more to match that provided by the sloted holes 38 in the vertical arm 33.

It may thus be seen that the arrangement of the elements depicted in the several embodiments of this invention serve to produce a wheel lift which, if applied to each wheel of a multi-wheeled vehicle, will lift the vehicle on the air bearings and provide free omni-directional movement parallel to the floor.

Certain examplary embodiments of this invention have been described above and are shown in the accompanying drawings. It is to be understood that such embodiments are merely illustrative of, and not restrictive on, the broad invention. It is not intended to limit the invention to these specific arrangements, constructions, or structures described or shown, for various modifications thereof may occur to persons having ordinary skill in the art.

What is claimed is:

1. A wheel lift supported by air bearings for moving multi-wheeled vehicles by lifting the vehicles at the wheels, comprising:

a base having a pair of generally parallel arms connected by cross structure;

facing surfaces, located in each of said arms, shaped to generally wedge against said wheel to be lifted and thereby form opposing chocks, at least one of which is adjustable within said arm so as to change the distance between said chocks;

means to adjust and maintain said adjustable chocks in engagement with said wheel to be lifted;

an air bearing under each of said arms so as to provide a two air bearing support; and means connecting said wheel lift to said multi-wheeled vehicle to resist any over-turning moment produced by said two air bearing support, whereby stabilizing said wheel lift.

2. The wheel lift of claim 1 wherein said means to adjust and maintain said adjustable chock in engagement with said wheel is a slideable chock, inside said arm, energized by an air inflatable bag.

3. The wheel lift of claim 1 wherein said means to adjust and maintain said adjustable chock in engagement with said wheel is a slideable chock, inside said arm, energized by at least one pneumatic cylinder.

4. The wheel lift of claim 1 wherein said means to adjust and maintain said adjustable chock in engagement with said wheel is a moveable chock with a serrated bottom surface to match a serrated engaging surface and means to secure said serrated chock.

5. The wheel lift of claim 2 further comprising control means to apply air to both of said air bearings and said air inflatable bag to move said adjustable chocks.

6. The wheel lift of claim 5 wherein said wheel lift is adapted for application from the outboard side of said wheel attached to said vehicle and said means connecting said wheel lift to said multi-wheeled vehicle to resist any over-turning moment further comprises:

a vertical arm attached to said cross structure portion of said base; and a hook pivotally attached to the upper end of said vertical arm so that said hook can grasp said wheel to be lifted, generally opposite said chocks.

7. The wheel lift of claim 6 wherein said hook is adjustable to accommodate wheels of different width.

8. The wheel lift of claim 6 wherein said vertical arm length is adjustable to accommodate wheels of different diameter.

9. The wheel lift of claim 5 wherein said wheel lift is adapted for application from the inboard side of said wheel attached to said vehicle and said means connecting said wheel lift to said multi-wheeled vehicle to resist any over-turning moment further comprises an inboard support attached to said cross structure which engages fixed structure of said vehicle.

10. The wheel lift of claim 9 wherein said inboard support attached to said cross structure is adjustable.

11. A wheel lift, supported by air bearings, for moving multi-wheeled vehicles by lifting the vehicles, from the outboard side, at the wheels comprising:
a base having a pair of generally parallel arms connected by cross structure so as to form a generally U-shape;
a pair of opposing chocks attached to each of said arms so that said chocks face each other, having facing surfaces shaped to generally wedge against said wheel to be lifted and at least one of said chocks adjustable so as to change the distance between said chocks so as to engage said wheel;
a vertical arm attached to said cross structure, generally intermediate said parallel arms;
a hook pivotally attached to the upper end of said vertical arm so that said hook can grasp said wheel to be lifted generally opposite said chocks; and
an air bearing under each of said arms so as to provide a two air bearing support.

12. The wheel lift of claim 11 further comprising first means to adjust said hook vertically on said vertical arm so as to accommodate different diameter wheels and second means to adjust said hook so as to accommodate different wheel thickness.

13. A wheel lift, supported by air bearings, for moving multi-wheeled vehicles by lifting the vehicles from the inboard side, at the wheels, comprising;
a base having a pair of generally parallel arms connected by cross structure so as to form a generally U-shape;
a pair of opposing chocks attached to each of said arms so that said chocks face each other, having surfaces shaped to generally wedge against said wheel to be lifted and at least one of said chocks adjustable so as to change the distance between said chocks so as to engage said wheel to be lifted;
an inboard support attached to said cross structure which engages fixed structure of said vehicle so as to resist any over-turning moment; and
an air bearing under each of said arms so as to provide a two air bearing support.

14. The wheel lift of claim 13 further comprising means to adjust said inboard support so as to accommodate different vehicle structure.

* * * * *